(12) United States Patent
Mehra et al.

(10) Patent No.: US 12,071,126 B2
(45) Date of Patent: Aug. 27, 2024

(54) VEHICLE OBJECT TRACKING

(71) Applicant: Ford Global Technologies, LLC, Dearborn, MI (US)

(72) Inventors: Aakar Mehra, Ann Arbor, MI (US); David Dekime, Manalapan, NJ (US); Kenneth Harkenrider, Fort Lauderdale, FL (US); Abhishek Sharma, West Bloomfield, MI (US); Douglas Blue, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 436 days.

(21) Appl. No.: 17/486,002

(22) Filed: Sep. 27, 2021

(65) Prior Publication Data

US 2023/0099598 A1 Mar. 30, 2023

(51) Int. Cl.
*B60W 30/09* (2012.01)
*B60Q 9/00* (2006.01)
(Continued)

(52) U.S. Cl.
CPC .............. *B60W 30/09* (2013.01); *B60T 7/22* (2013.01); *B60W 30/0953* (2013.01); *B60W 30/0956* (2013.01); *G08G 1/16* (2013.01); *B60Q 9/008* (2013.01); *B60T 2210/32* (2013.01); *B60T 2220/00* (2013.01); *B60T 2250/04* (2013.01); *B60W 2520/10* (2013.01);
(Continued)

(58) Field of Classification Search
CPC .. B60W 30/0956; B60W 10/18; B60W 10/06; B62D 15/0285; G06V 20/56; G06V 20/58; G05D 1/0212; G01S 17/08; B60L 15/2009; G01C 21/30; H01Q 25/002; G08G 1/096775
See application file for complete search history.

(56) References Cited

U.S. PATENT DOCUMENTS 6,686,867 B1 * 2/2004 Lissel ................. H01Q 25/002
343/753
9,983,306 B2 5/2018 Zeng et al.
(Continued)

FOREIGN PATENT DOCUMENTS

DE 60032969 T2 * 10/2007 ....... G08G 1/096716

OTHER PUBLICATIONS

Moon et al., "Multi-vehicle target selection for adaptive cruise control"; Vehicle System Dynamics; ISSN: 0042-3114 (Print) 1744-5159 (Online) Journal homepage: https://www.tandfonline.com/loi/nvsd20; https://doi.org/10.1080/00423114.2010.499952.

*Primary Examiner* — Yuri Kan
(74) *Attorney, Agent, or Firm* — Frank A. MacKenzie; Bejin Bieneman PLC

(57) ABSTRACT

A computer includes a processor and a memory storing instructions executable by the processor to receive sensor data indicating a current position of an object, determine a predicted position of the object at a future time, and instruct a component of a vehicle to actuate based on the current position being in a first zone of a plurality of zones surrounding the vehicle and the predicted position being in a second zone of the plurality of zones different than the first zone. The zones are nonoverlapping and have preset boundaries relative to the vehicle.

20 Claims, 7 Drawing Sheets

(51) Int. Cl.
  *B60T 7/22* (2006.01)
  *B60W 30/095* (2012.01)
  *G08G 1/16* (2006.01)
(52) U.S. Cl.
  CPC ..... *B60W 2540/18* (2013.01); *B60W 2554/40* (2020.02); *B60W 2554/80* (2020.02); *B60W 2710/18* (2013.01)

(56) References Cited

U.S. PATENT DOCUMENTS

| | | |
|---|---|---|
| 10,232,849 B2 | 3/2019 | Liu et al. |
| 10,782,689 B2 | 9/2020 | Yu et al. |
| 11,584,297 B2 * | 2/2023 | Yamanaka ......... B62D 15/0285 |
| 2014/0152827 A1 * | 6/2014 | Yamamoto ............. G06V 20/56 |
| | | 348/148 |
| 2017/0080857 A1 | 3/2017 | Herman et al. |
| 2020/0241549 A1 * | 7/2020 | Tsurumi ................ G05D 1/0212 |
| 2020/0290632 A1 * | 9/2020 | Hiruma .................. G06V 20/58 |
| 2021/0101588 A1 | 4/2021 | Pontisakos et al. |
| 2021/0171023 A1 * | 6/2021 | Shalev-Shwartz .... B60W 10/18 |
| 2021/0293932 A1 * | 9/2021 | Bruce-Wen ............. G01S 17/08 |
| 2021/0370780 A1 * | 12/2021 | Cho .................... B60L 15/2009 |
| 2023/0242102 A1 * | 8/2023 | Komoriya ............... G01C 21/30 |
| | | 701/301 |

\* cited by examiner

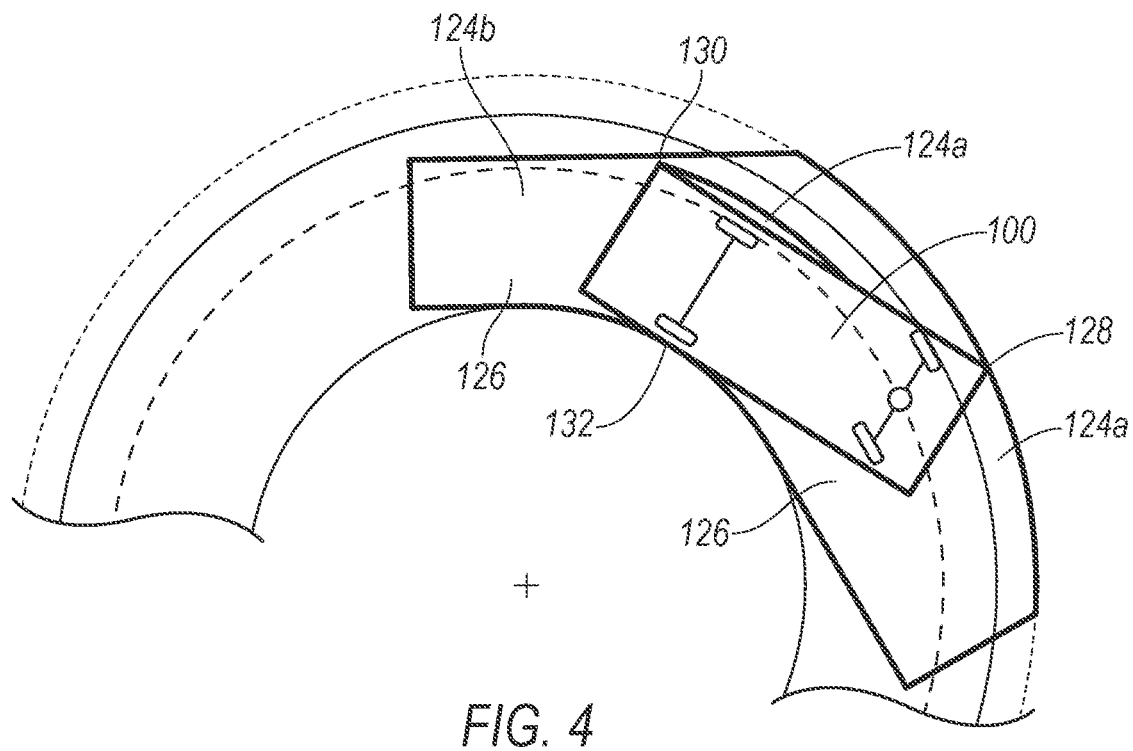
FIG. 4
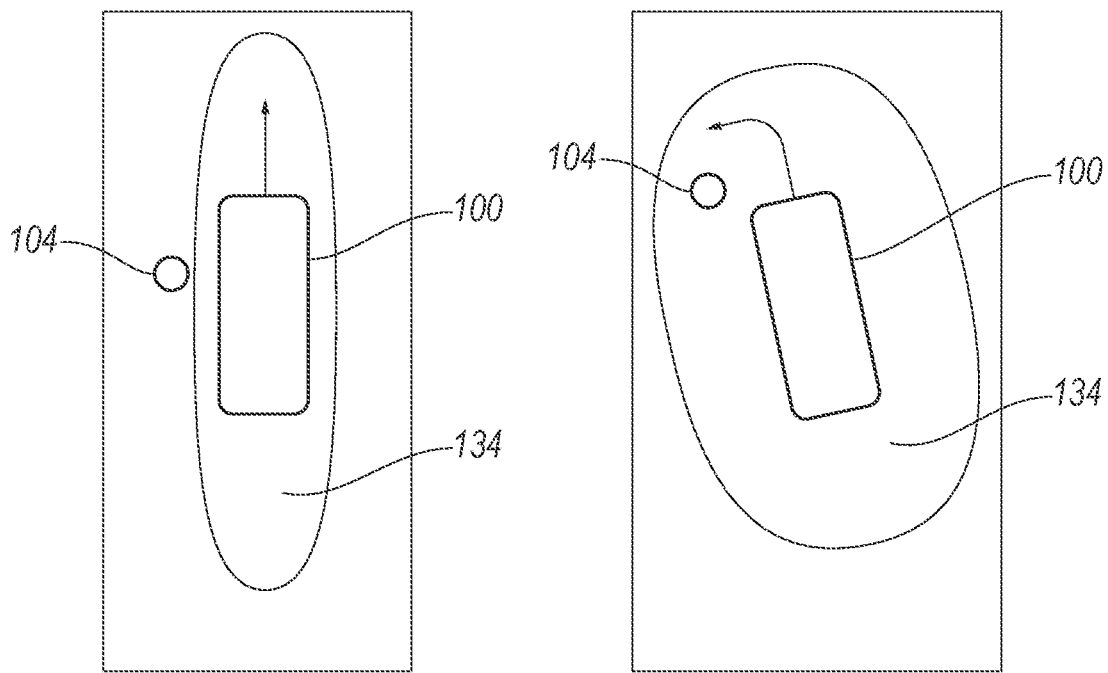
FIG. 5A
FIG. 5B

VEHICLE OBJECT TRACKING

BACKGROUND

Advanced driver assistance systems (ADAS) are groups of electronic technologies that assist drivers in driving and parking functions. Examples of ADAS include forward collision warning, lane-departure warning, blind-spot warning, automatic emergency braking, adaptive cruise control, and lane-keeping assistance.

BRIEF DESCRIPTION OF THE DRAWINGS

FIG. 4 is a diagram of the vehicle turning.

FIGS. 5A and 5B are diagrams of a region surrounding the vehicle.

DETAILED DESCRIPTION

Figure 1:
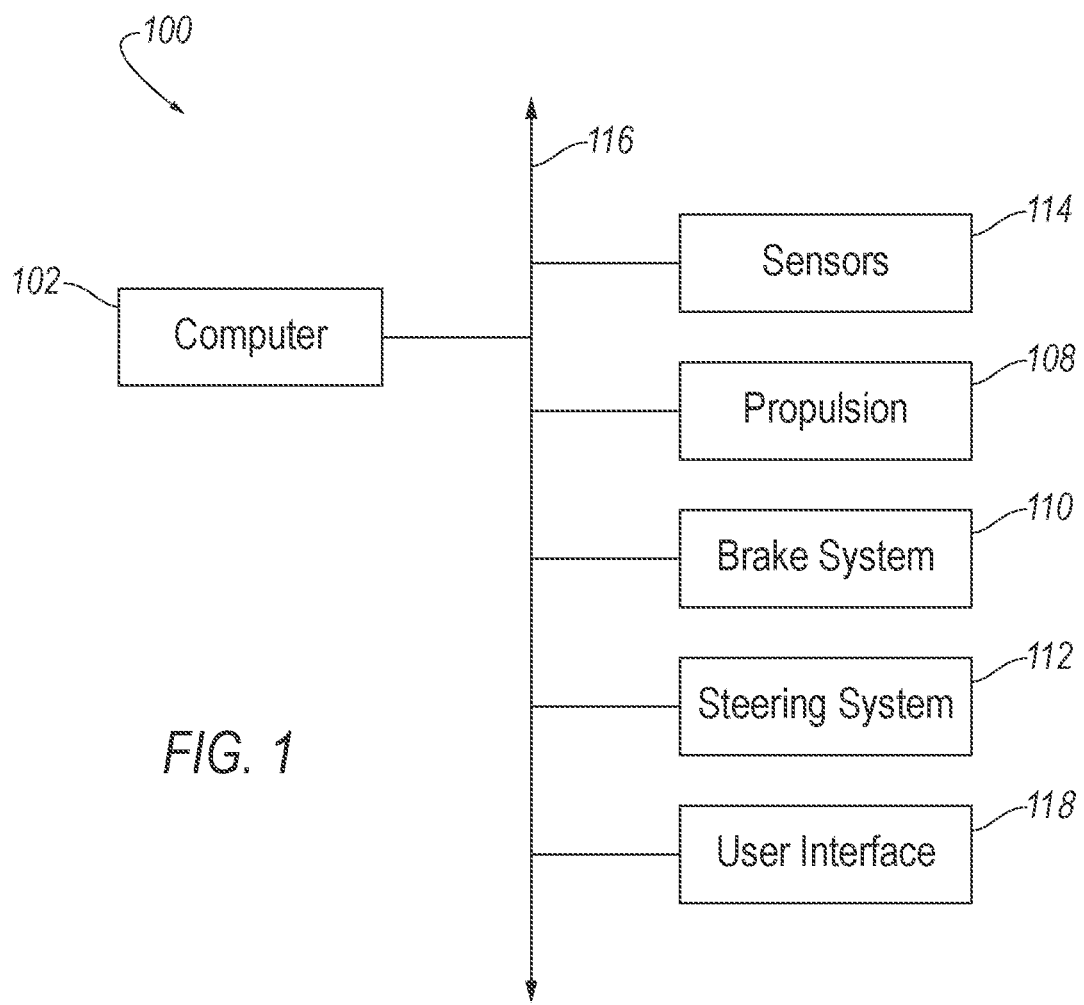
FIG. 1 is a block diagram of an example vehicle.

This disclosure describes systems and techniques for selecting a subset of objects detected by sensors of a vehicle on which a component of the vehicle can be actuated, e.g., autonomous operation or ADAS functions. A computer can receive data indicating stationary and moving objects in the vicinity of the vehicle. The computer selects a subset of the objects based on various criteria described below. The computer uses the objects in the subset when determining whether to actuate vehicle components, e.g., ADAS functions such as braking the vehicle or preventing the vehicle from steering into an adjacent lane. Selecting the subset conserves computer resources compared to tracking all the objects detected by the sensors, permitting the actuation of the vehicle component to occur more quickly.

Selecting the subset is performed in a manner that prioritizes objects that are more likely to trigger actuation of a vehicle component. For example, the computer can use a current position and/or a predicted position of the object to determine whether to include the object in the subset. The positions can be compared to zones surrounding the vehicle that have preset boundaries relative to the vehicle. For example, the computer can include an object in the subset if the current position of the object is in a first zone, e.g., a zone behind the vehicle, and the predicted position is in a second zone, e.g., a zone beside the vehicle.

A computer includes a processor and a memory storing instructions executable by the processor to receive sensor data indicating a current position of an object, determine a predicted position of the object at a future time, and instruct a component of a vehicle to actuate based on the current position being in a first zone of a plurality of zones surrounding the vehicle and the predicted position being in a second zone of the plurality of zones different than the first zone. The zones are nonoverlapping and have preset boundaries relative to the vehicle.

The second zone may be forward of the first zone relative to the vehicle when a gear of the vehicle is a forward gear, and the second zone may be rearward of the first zone when the gear is a reverse gear.

The zones may border the vehicle.

The component may be a brake system.

Instructing the component to actuate may be further based on a speed of the object relative to a speed of the vehicle.

The object may be a first object, and the instructions may further include instructions to, before determining the predicted position of the object, receive sensor data indicating current positions of a plurality of objects including the first object; and select a subset of the objects including the first object, the objects in the subset having current positions closer to the vehicle than the objects not in the subset. The plurality of objects may be moving objects.

That the current position is in the first zone and the predicted position is in the second zone may be one of a plurality of motion criteria; the instructions may further include instructions to receive sensor data indicating current positions of a plurality of objects including the object, determine a first subset of the objects that satisfy at least one of the motion criteria, and determine a second subset of the objects from the first subset that have current positions closer to the vehicle than the objects from the first subset that are not in the second subset; and instructing the component to actuate may be based on the objects in the second subset.

The object may be a first object, the current position may be a first current position, and the instructions may further include instructions to receive sensor data indicating a second current position of a second object, the second object being stationary; and instruct the component to actuate based on the second current position being in a region defined relative to the vehicle. The region may be different than the zones.

The region may surround the vehicle.

The instructions may further include instructions to determine the region based on a steering-wheel angle of the vehicle. The region may include an area that will be swept by a body of the vehicle in a direction of travel at the steering-wheel angle. The region may be a first region, and the instructions may further include instructions to receive sensor data indicating a third current position of a third object, the third object being stationary; and instruct the component to actuate based on the third position being in a second region defined relative to the vehicle, the second region surrounding the vehicle.

A lateral width of the region relative to the vehicle may increase with increasing steering-wheel angle. The instructions may further include instructions to determine the region based on a speed of the vehicle. A longitudinal length of the region may increase with increasing speed of the vehicle.

The instructions may further include instructions to receive sensor data indicating current positions of a plurality of stationary objects including the second object; and select a subset of the stationary objects including the second object, the stationary objects in the subset having current positions closer to the vehicle than the stationary objects not in the subset.

The instructions may further include instructions to receive sensor data indicating current positions of a plurality of objects including the object, select a subset of the objects that have current positions closer to the vehicle than the objects not in the subset, and output a message to a user interface indicating the objects in the subset.

A method includes receiving sensor data indicating a current position of an object, determining a predicted position of the object at a future time, and instructing a component of a vehicle to actuate based on the current position being in a first zone of a plurality of zones surrounding the vehicle and the predicted position being in a second zone of the plurality of zones different than the first zone. The zones are nonoverlapping and have preset boundaries relative to the vehicle.

With reference to the Figures, wherein like numerals indicate like parts throughout the several views, a computer 102 includes a processor and a memory storing instructions executable by the processor to receive sensor data indicating a current position of an object 104, determine a predicted position of the object 104 at a future time, and instruct a component of a vehicle 100 to actuate based on the current position being in a first zone 106 of a plurality of zones 106 surrounding the vehicle 100 and the predicted position being in a second zone 106 of the plurality of zones 106 different than the first zone 106. The zones 106 are nonoverlapping and have preset boundaries relative to the vehicle 100.

With reference to FIG. 1, the vehicle 100 may be any passenger or commercial automobile such as a car, a truck, a sport utility vehicle, a crossover, a van, a minivan, a taxi, a bus, etc.

The vehicle 100 may be an autonomous or semi-autonomous vehicle. The computer 102 can be programmed to operate the vehicle 100 independently of the intervention of a human operator, completely or to a lesser degree. The computer 102 may be programmed to operate a propulsion 108, a brake system 110, a steering system 112, and/or other vehicle systems based on sensor data received from sensors 114 of the vehicle 100. For the purposes of this disclosure, autonomous operation means the computer 102 controls the propulsion 108, brake system 110, and steering system 112 without input from a human operator; semi-autonomous operation means the computer 102 controls one or two of the propulsion 108, brake system 110, and steering system 112 and a human operator controls the remainder; and nonautonomous operation means a human operator controls the propulsion 108, brake system 110, and steering system 112. Semi-autonomous operation includes performing ADAS functions.

The computer 102 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 102 can thus include a processor, a memory, etc. The memory of the computer 102 can include media for storing instructions executable by the processor as well as for electronically storing data and/or databases, and/or the computer 102 can include structures such as the foregoing by which programming is provided. The computer 102 can be multiple computers coupled together.

The computer 102 may transmit and receive data through a communications network 116 such as a controller area network (CAN) bus, Ethernet, WiFi, Local Interconnect Network (LIN), onboard diagnostics connector (OBD-II), and/or by any other wired or wireless communications network. The computer 102 may be communicatively coupled to the sensors 114, the propulsion 108, the brake system 110, the steering system 112, a user interface 118, and other components via the communications network 116.

The sensors 114 may provide data about operation of the vehicle 100, for example, wheel speed, wheel orientation, and engine and transmission data (e.g., temperature, fuel consumption, etc.). The sensors 114 may detect the location and/or orientation of the vehicle 100. For example, the sensors 114 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 114 may detect the external world, e.g., the objects 104 and/or characteristics of surroundings of the vehicle 100, such as other vehicles, road lane markings, traffic lights and/or signs, pedestrians, etc. For example, the sensors 114 may include radar sensors, scanning laser range finders, light detection and ranging (LIDAR) devices, and image processing sensors such as cameras.

The propulsion 108 of the vehicle 100 generates energy and translates the energy into motion of the vehicle 100. The propulsion 108 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion 108 can include an electronic control unit (ECU) or the like that is in communication with and receives input from the computer 102 and/or a human operator. The human operator may control the propulsion 108 via, e.g., an accelerator pedal and/or a gear-shift lever.

The brake system 110 is typically a conventional vehicle braking subsystem and resists the motion of the vehicle 100 to thereby slow and/or stop the vehicle 100. The brake system 110 may include friction brakes such as disc brakes, drum brakes, band brakes, etc.; regenerative brakes; any other suitable type of brakes; or a combination. The brake system 110 can include an electronic control unit (ECU) or the like that is in communication with and receives input from the computer 102 and/or a human operator. The human operator may control the brake system 110 via, e.g., a brake pedal.

The steering system 112 is typically a conventional vehicle steering subsystem and controls the turning of the wheels. The steering system 112 may be a rack-and-pinion system with electric power-assisted steering, a steer-by-wire system, as both are known, or any other suitable system. The steering system 112 can include an electronic control unit (ECU) or the like that is in communication with and receives input from the computer 102 and/or a human operator. The human operator may control the steering system 112 via, e.g., a steering wheel.

The user interface 118 presents information to and receives information from an occupant of the vehicle 100. The user interface 118 may be located, e.g., on an instrument panel in a passenger cabin of the vehicle 100, or wherever may be readily seen by the occupant. The user interface 118 may include dials, digital readouts, at least one screen 122, speakers, and so on for providing information to the occupant, e.g., human-machine interface (HMI) elements such as are known. The user interface 118 may include buttons, knobs, keypads, microphone, and so on for receiving information from the occupant.

Figure 2:
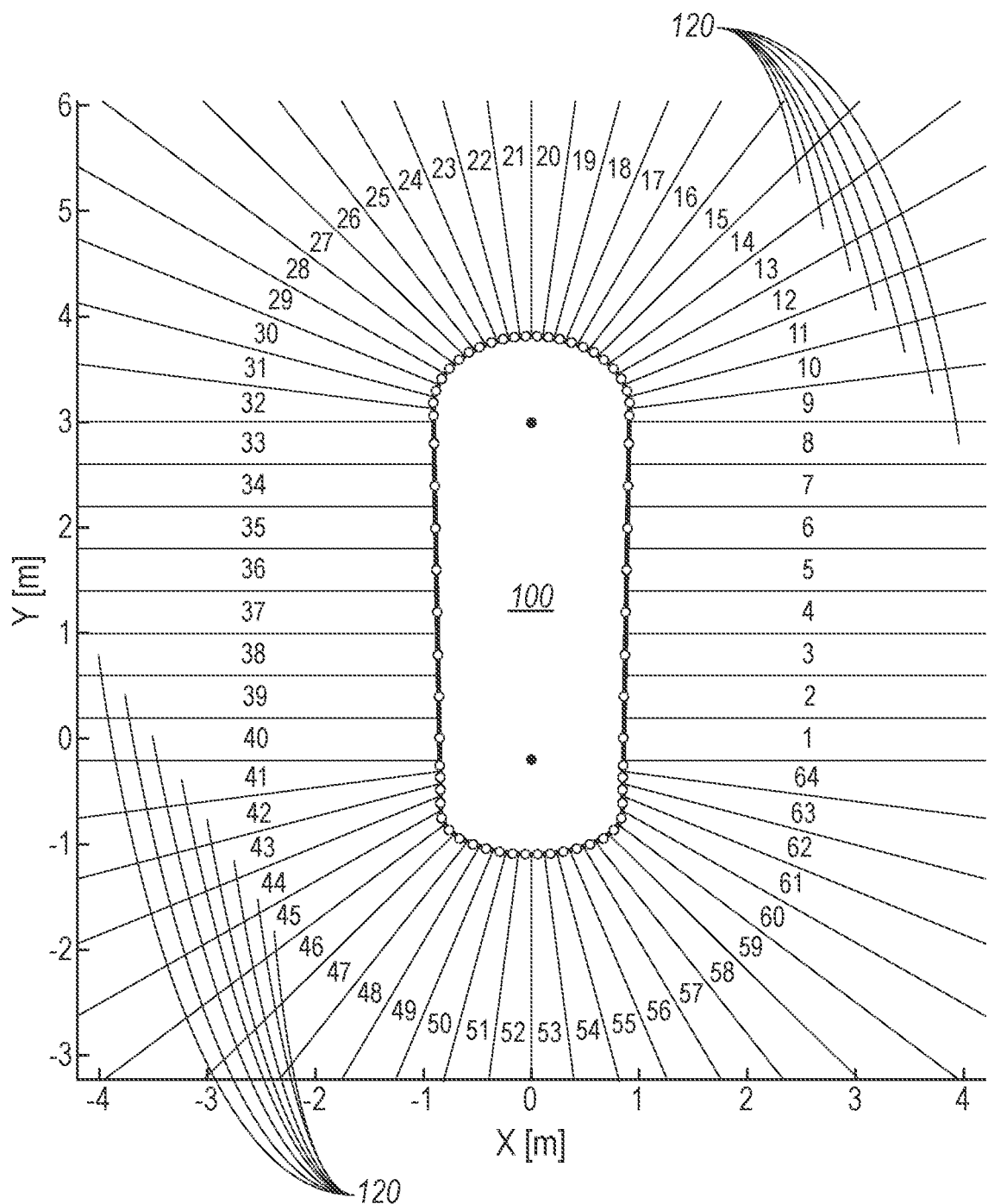
FIG. 2 is a diagram of areas of sensor detection relative to the vehicle.

With reference to FIG. 2, the computer 102 can receive sensor data from the sensors 114, e.g., image data from cameras, LIDAR data from LIDARs, radar data from radars, etc. The sensor data can include the current positions and/or current velocities of a plurality of objects 104 in the environment around the vehicle 100. For example, radar data and LIDAR data can include current positions in the form of pairs of headings and distances relative to the respective sensors 114. For another example, the current position and/or velocity of an object 104 can be determined as a result of preprocessing the sensor data, as will be described.

The preprocessing can include sensor fusion. Sensor fusion is combining data from disparate sources together so that the resulting data has less uncertainty than if the data from each source were used individually, e.g., in creating a unified model of the surrounding environment of the vehicle 100. The sensor fusion can be performed with one or more algorithms, e.g., Kalman filter, central limit theorem, Bayesian networks, Dempster-Shafer, convolutional neural networks, etc.

For example, the output of the sensor fusion can include a distance to the nearest object 104 within each of a plurality of angular segments 120 arranged circumferentially around the vehicle 100, as shown in FIG. 2. (For clarity, only some of the angular segments 120 in FIG. 2 are labeled.) For another example, the output of the sensor fusion can include up to a preset number of objects 104 being tracked around the vehicle 100, i.e., the preset number of objects 104 if at least that number of objects 104 are present or fewer than the preset number of objects 104 if fewer objects 104 are present. The sensor data for each tracked object 104 can include a current position; a current velocity; a size, e.g., a size classification such as small for pedestrians and bicycles, medium for cars and SUVs, and large for buses and trucks; a type, such as pedestrian, bicycle, motorcycle, automobile, bus, etc.; and/or an orientation. For another example, the output of the sensor fusion can include a combination of the previous two types of output, e.g., up to a first preset number of stationary objects 104 taken from the points detected within the angular segments 120 and a second preset number of moving objects 104 being tracked around the vehicle 100. The first and second preset numbers can be chosen based on available computing resources and ensuring a sufficiently large number of objects 104 to select from using the techniques described below, e.g., 64 stationary objects 104 and 96 moving objects 104.

The computer 102 can select a subset of the objects 104 returned by the sensor fusion for outputting to the user interface 118. For example, the computer 102 can select the subset of the objects 104 that have current positions closer to the vehicle 100 than the objects 104 not in the subset, i.e., the closest objects 104, e.g., a preset number of the closest objects 104, e.g., up to 16. The preset number can be chosen based on an ability of the occupant to understand the output of the user interface 118. As will be described below, the computer 102 can select different subsets of objects 104 for outputting to the user interface 118 and for actuating the vehicle components.

Figure 3:
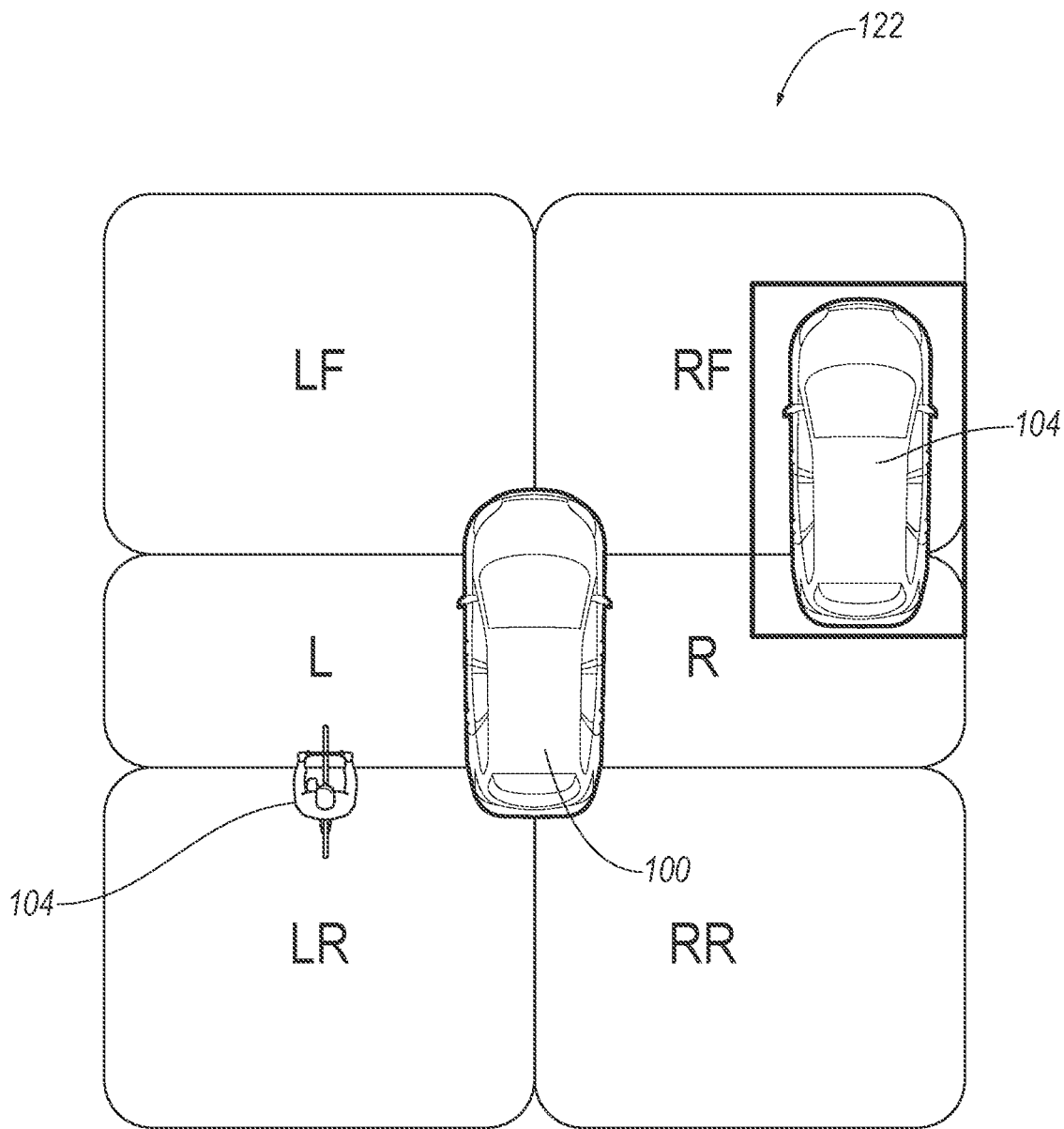
FIG. 3 is a diagram of an example output indicating detected objects.

With reference to FIG. 3, the computer 102 can output a message to the user interface 118 indicating the objects 104 in the subset. For example, the screen 122 of the user interface 118 can graphically display types of the objects 104 using icons stored in memory and current positions of the objects 104 relative to the vehicle 100 using corresponding positions on the screen 122.

With reference to FIG. 4, the computer 102 can select an object 104 for actuating the vehicle component based on the current position of the object 104 being in a first region 126 defined relative to the vehicle 100. The first region 126 can be different than the zones 106, which will be described below. The computer 102 can determine the first region 126, i.e., define boundaries of the first region 126, based on a steering-wheel angle of the vehicle 100. For example, the first region 126 can include an area 124 swept by a body of the vehicle 100 in a direction of travel at the steering-wheel angle. The direction of travel can be forward or reverse depending on a gear of the vehicle 100, indicated by first area 124a in the forward direction of travel and a second area 124b in the reverse direction of travel. At a constant steering-wheel angle, the vehicle 100 travels along a circle defined by the steering-wheel angle. For example, the computer 102 can determine the first region 126 using dimensions of the vehicle 100 and a vehicle-dynamics model, e.g., by tracing points on the vehicle 100 through space. The points can include, e.g., an outside front corner 128, an outside rear corner 130, and an inside rear wheel 132. At a constant steering-wheel angle, the points on the vehicle 100 travel along circles around the same center point defined by the steering-wheel angle. The first region 126 can include the area 124 swept by the vehicle 100 in the direction of travel for a path length, which can be preset or can vary with a speed of the vehicle 100.

With reference to FIGS. 5A-B, the computer 102 can select an object 104 for actuating the vehicle component based on the current position of the object 104 being in a second region 134 defined relative to the vehicle 100. The second region 134 can be different than the zones 106, which will be described below. The computer 102 can determine the second region 134, i.e., define boundaries of the second region 134, based on a steering-wheel angle of the vehicle 100 and/or based on a speed of the vehicle 100. For example, the second region 134 can surround the vehicle 100 and have a longitudinal length greater than a length of the vehicle 100 and a lateral width greater than a width of the vehicle 100. The longitudinal length can increase with increasing speed of the vehicle 100, thereby capturing an area farther in front of the vehicle 100 when the vehicle 100 is traveling faster. The lateral width can increase with increasing steering-wheel angle, as seen by comparing FIGS. 5A and 5B, thereby capturing an area farther beside the vehicle 100 when the vehicle 100 is turning more. For example, the second region 134 can be an ellipse or a superellipse with a major axis being the longitudinal length and a minor axis being the lateral width. A superellipse is a curve with the form $|x/a|^n + |y/b|^n = 1$, in which a and b are half of the major or minor axis and n is the order. The order n of the superellipse can be greater than 2, e.g., 4, thereby giving the superellipse a rounded rectangle shape. Making the second region 134 a superellipse provides good coverage of the vicinity of the vehicle 100 while tracking the generally rectangular footprint of the vehicle 100.

The computer 102 can select an object 104 for actuating the vehicle component based on the current position of the object 104 being in the first region 126, being in the second region 134, or being in either the first region 126 or the second region 134. Specifically, the computer 102 can select a first preset number of stationary objects 104 having current positions in the first region 126 and a second preset number of stationary objects 104 having current positions in the second region 134.

Figure 6:
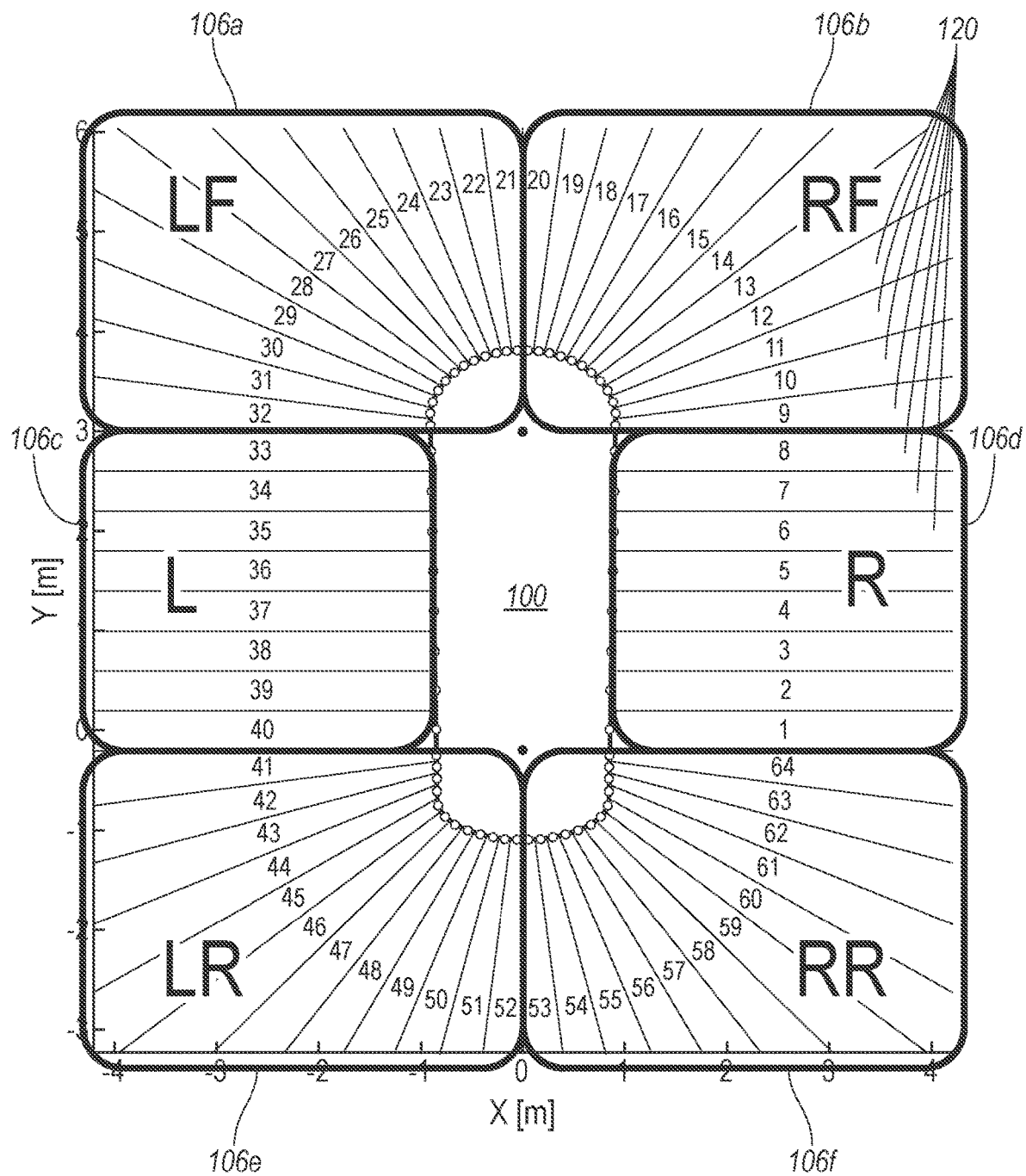
FIG. 6 is a diagram of zones surrounding the vehicle.

With reference to FIG. 6, the computer 102 can select objects 104 (as seen in FIG. 3), e.g., moving objects 104, for actuating the vehicle component based on the zones 106. The zones 106 have preset boundaries relative to the vehicle 100, i.e., the zones 106 are stored in the memory of the computer 102, and when the vehicle 100 moves, the zones 106 move with the vehicle 100. The zones 106 are nonoverlapping. The zones 106 can border the vehicle 100. The zones 106 can border each other. The zones 106 can collectively encircle the vehicle 100. The zones 106 can include at least one zone 106 in front of the vehicle 100, at least one zone 106 beside the vehicle 100 on each side, and at least one zone 106 rear of the vehicle 100. For example, the zones 106 can include a left front zone 106a that extends forward a first preset distance from the front axle and left a second preset distance from the midline of the vehicle 100, a right front zone 106b that extends forward the first preset distance from the front axle and right the preset second distance from the midline, a left zone 106c that extends from the front axle to the rear axle and left the second preset distance from the midline, a right zone 106d that extends from the front axle to the rear axle and right the second preset distance from the midline, a left rear zone 106e that extends rearward the first preset distance from the rear axle and left the second preset distance from the midline, and a right rear zone 106f that extends rearward the first preset distance from the rear axle and right the second preset distance from the midline.

The computer 102 can determine the predicted position of an object 104 at a future time, for use when selecting objects 104 for actuating the vehicle component as described below. For example, the computer 102 can use dead reckoning, e.g., for one time step, e.g., the current position added to a product of the current velocity and the change in time from the current time to the future time, i.e., $P_p = P_c + V_c * \Delta t$, in which $P_p$ is a vector of the predicted position, $P_c$ is a vector of the current position, $V_c$ is a vector of the current velocity, and $\Delta t$ is the change in time from the current time to the future time. The future time can be chosen to be sufficiently long to capture events for the vehicle 100 to respond to and sufficiently short that using dead reckoning for one time step is accurate.

The computer 102 can determine which zone 106 includes a current or predicted position of an object 104. For example, the computer 102 can compare the coordinates of the current or predicted position with the boundaries of the zones 106 stored in memory. For another example, the computer 102 can determine which angular segments 120 contain points on the object 104. The angular segments 120 can be assigned to the zones 106 in memory, as shown in FIG. 6.

The computer 102 can select objects 104, e.g., moving objects 104, for actuating the vehicle component based on whether one of a plurality of motion criteria are satisfied. A motion criterion is a set of one or more conditions involving the motion of the object 104. The table below lists motion criteria in the rows, with each entry in the row being one of the conditions. An object 104 satisfies one of the motion criteria if the object 104 satisfies the conditions for that motion criterion, i.e., satisfies all the entries in at least one row of the table. The columns of the table are the categories of the conditions. The categories of the conditions can include (i.e., the computer 102 can select the objects 104 based on) a gear of the vehicle 100, a zone 106 including the current position of the object 104, a position of the object 104 relative to the front or rear fascia of the vehicle 100, a heading of the object 104 relative to the heading of the vehicle 100, a speed of the object 104 relative to a speed of the vehicle 100, a lateral position of the object 104 relative to a width of the vehicle 100, and a zone 106 including the predicted position of the object 104. Using the first row of the table as an example, a motion criterion can be that the vehicle 100 is in a forward gear, the current position of the object 104 is in the right or left rear zone 106e—f, the object 104 is positioned directly behind the rear fascia, the heading of the object 104 is within a threshold of the heading of the vehicle 100, the speed of the object 104 is greater than the speed of the vehicle 100, the lateral position of the object 104 is outside the width of the vehicle 100, and the predicted position of the object 104 is in the left or right zone 106c—d.

| Gear | Current Zone | Fascia Position | Object Heading | Object Speed | Lateral Position | Predicted Zone |
|---|---|---|---|---|---|---|
| Forward | Rear zones | Directly behind rear | ≈Vehicle heading | >Vehicle speed | >Vehicle width | Lateral zones |
| Forward | Lateral zones | Any | Away from vehicle | ≤Vehicle speed | >Vehicle width | Front zones |
| Forward | Front zones | Any | Not crossing | <Vehicle speed | Any | Any |
| Reverse | Left front zone | Directly behind front | ≈Vehicle heading | >Vehicle speed | >Vehicle width | Left zone |
| Reverse | Right front zone | Directly behind front | ≈Vehicle heading | ≤Vehicle speed | >Vehicle width | Right zone |
| Reverse | Left zone | Any | Away from vehicle | ≤Vehicle speed | >Vehicle width | Left front zone |
| Reverse | Right zone | Any | Away from vehicle | >Vehicle speed | >Vehicle width | Right front zone |
| Reverse | Rear zones | Directly behind rear | Not crossing | <Vehicle speed | Any | Any |

Some of the motion criteria include the current position being in a first zone 106 and the predicted position being in a second zone 106. The second zone 106 can be forward of the first zone 106 relative to the vehicle 100 when the vehicle 100 is in a forward gear, e.g., in the first row of the table, the current position is in the left or right rear zone 106e—f and the predicted position is in the left or right zone 106c—d; and in the second row, the current position is in the left or right zone 106c—d and the predicted position is in the left or right front zone 106a—b. The second zone 106 can be rearward of the first zone 106 when the vehicle 100 is in a reverse gear, e.g., in the fourth row of the table, the current position is in the left front zone 106a and the predicted position is in the left zone 106c; and in the fifth row of the table, the current position is in the right front zone 106b and the predicted position is in the right zone 106d.

Figure 7:
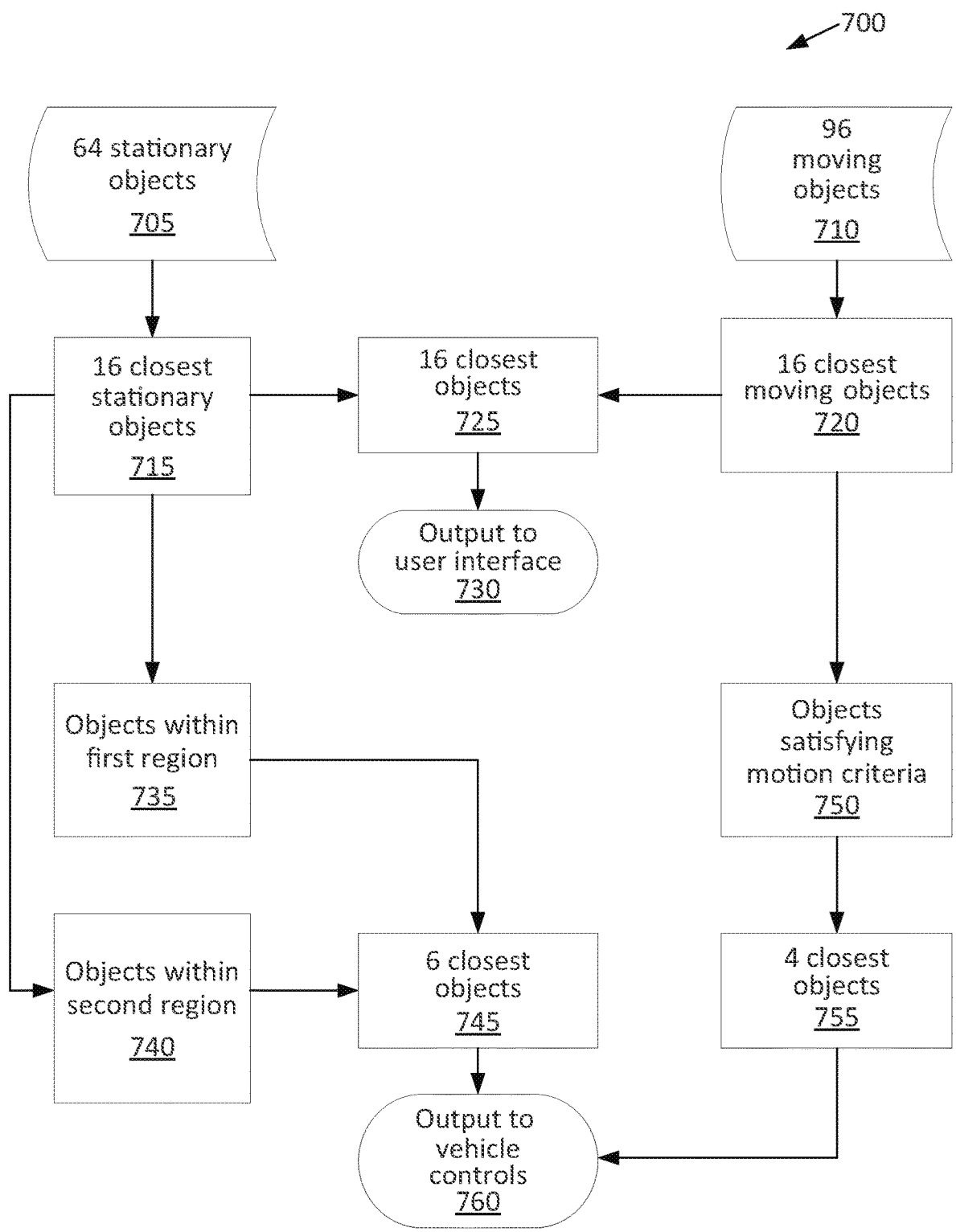
FIG. 7 is a data flow diagram showing an example data flow for selecting objects from sensor data.

FIG. 7 shows an example data flow 700 for selecting the objects 104 for actuating the vehicle component. The memory of the computer 102 stores executable instructions for selecting objects 104 according to the data flow 700 and/or programming can be implemented in structures such as mentioned above. As a general overview of the data flow 700, the computer 102 receives 64 stationary objects 104 and 96 moving objects 104, selects from those objects 104 the 16 closest stationary objects and 16 closest moving objects, selects from those objects 104 the 16 closest objects to output to the user interface 118. From the 16 closest stationary objects 104, the computer 102 selects the stationary objects 104 within the first region 126 and the second region 134, selects from those stationary objects 104 the 6 closest stationary objects 104, and uses those stationary objects 104 to evaluate whether to actuate the vehicle component. From the 16 closest moving objects, the computer 102 selects the moving objects 104 satisfying at least one motion criteria, selects from those moving objects the 4 closest moving objects, and uses those moving objects to evaluate whether to actuate the vehicle component.

An external data block 705 includes data indicating a first preset number of stationary objects 104, e.g., 64 stationary objects 104, taken from the points detected within the angular segments 120, as described above.

An external data block 710 includes data indicating a second preset number of moving objects 104 being tracked around the vehicle 100, e.g., 96 moving objects 104, as described above.

In a data block 715, the computer 102 selects a subset, e.g., 16, of the stationary objects 104 from the external data block 705 having current positions closest to the vehicle 100, as described above. The stationary objects 104 in the subset have current positions closer to the vehicle 100 than the stationary objects 104 not in the subset.

In a data block 720, the computer 102 selects a subset, e.g., 16, of the moving objects 104 from the external data block 710 having current positions closest to the vehicle 100, as described above. The moving objects 104 in the subset have current positions closer to the vehicle 100 than the moving objects 104 not in the subset.

In a data block 725, in which the computer 102 selects a subset, e.g., 16, from the closest stationary objects 104 from the data block 715 and the closest moving objects 104 from the data block 720. The objects 104 in the subset have current positions closer to the vehicle 100 than the objects 104 not in the subset.

In a terminal block 730, the computer 102 receives data indicating the objects 104 from the data block 725, which the computer 102 can use to instruct the user interface 118 to output a message indicating the objects 104 from the data block 725, as described above with respect to FIG. 3 as well as below with respect to a block 815 of a process 800.

In a data block 735, the computer 102 selects the stationary objects 104 from the data block 715 that have current positions in the first region 126, as described above with respect to FIG. 4.

In a data block 740, the computer 102 selects the stationary objects 104 from the data block 715 that have current positions in the second region 134, as described above with respect to FIGS. 5A-B.

In a data block 745, the computer 102 selects a subset of the stationary objects 104 from the data blocks 735, 740 having current positions closer to the vehicle 100 than the stationary objects 104 not in the subset. The subset can be a preset number of stationary objects 104 chosen to minimize computing resources expended while including the stationary objects 104 likely to cause the vehicle component to actuate, e.g., 6 objects 104.

In a data block 750, the computer 102 selects the moving objects 104 from the data block 720 that satisfy at least one of the motion criteria, as described above.

In a data block 755, the computer 102 selects a subset of the moving objects 104 from the data block 750 having current positions closer to the vehicle 100 than the moving objects 104 not in the subset. The subset can be a preset number of moving objects 104 chosen to minimize computing resources expended while including the moving objects 104 likely to cause the vehicle component to actuate, e.g., 4 objects 104.

In a terminal block 760, the computer 102 receives data indicating the objects 104 from the data blocks 745, 755, which the computer 102 can use to determine whether to instruct the vehicle component to actuate, as will be described below with respect to a decision block 860 of the process 800. The computer 102 disregards the objects 104 other than those received from the data blocks 745, 755 when determining whether to instruct the vehicle component to actuate.

Figure 8:
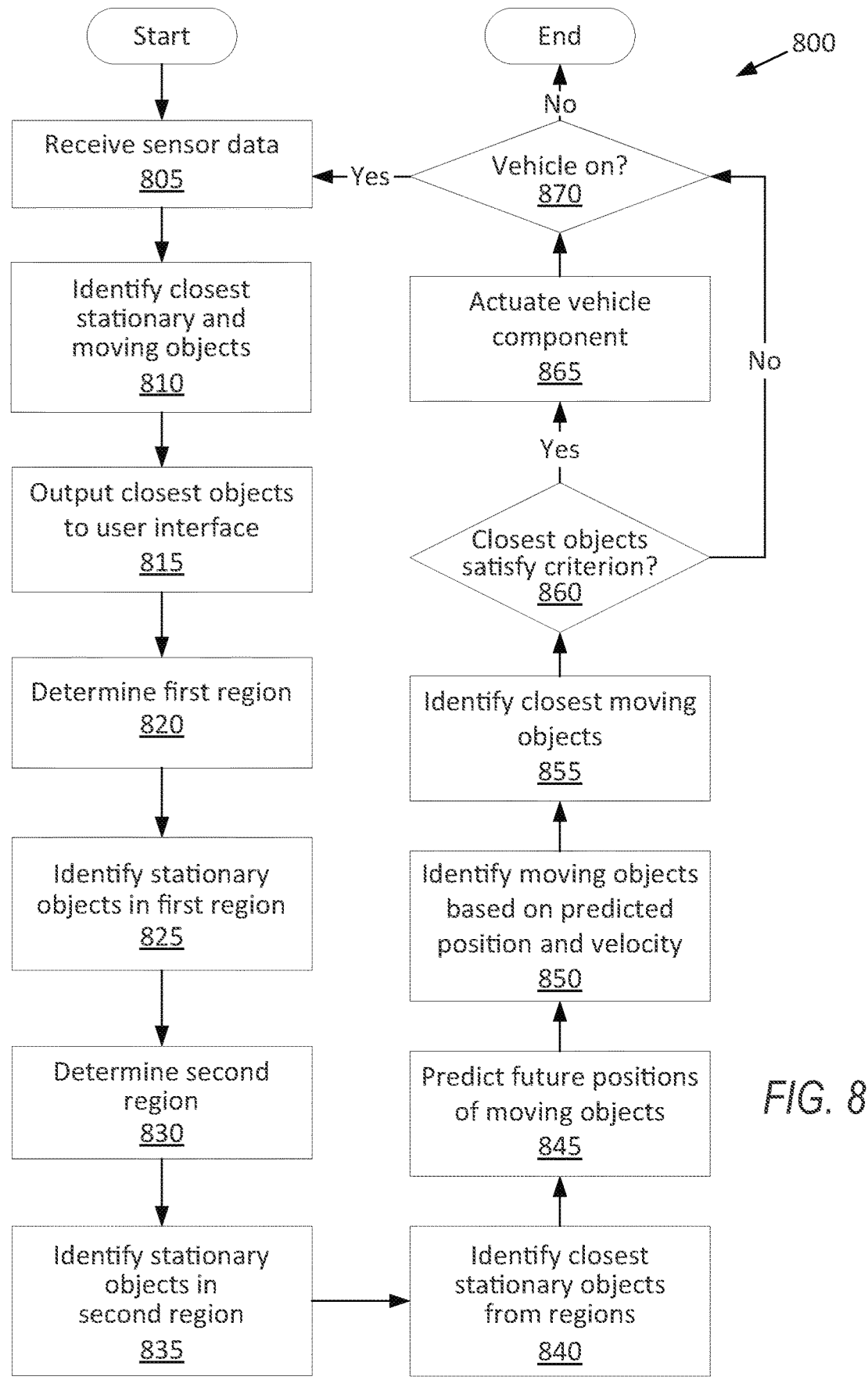
FIG. 8 is a process flow diagram show showing an example process for actuating a vehicle component based on selecting the objects from the sensor data.

FIG. 8 is a process flow diagram illustrating an exemplary process 800 for actuating the vehicle component based on selecting a subset of the objects 104 from the sensor data. The memory of the computer 102 stores executable instructions for performing the steps of the process 800 and/or programming can be implemented in structures such as mentioned above. As a general overview of the process 800, the computer 102 receives the sensor data, identifies the closest stationary and moving objects 104, outputs the closest stationary and moving objects 104 to the user interface 118, determines the first region 126, identifies the stationary objects 104 in the first region 126, determines the second region 134, identifies the stationary objects 104 in the second region 134, identifies the closest stationary objects 104 from the first region 126 and second region 134, determines the predicted positions of the moving objects 104, identifies the moving objects 104 satisfying at least one of the motion criteria, identifies the closest moving objects 104 that satisfied at least one of the motion criteria, and determines whether any of the closest stationary and moving objects 104 satisfy criteria for actuating the vehicle component. If so, the computer 102 actuates the vehicle component. The process 800 continues for as long as the vehicle 100 remains on.

The process 800 begins in a block 805, in which the computer 102 receives and preprocesses the sensor data, as described above.

Next, in a block 810, the computer 102 selects the closest stationary and moving objects 104, as described above with respect to the data blocks 715-725.

Next, in a block 815, the computer 102 outputs a message to the user interface 118 indicating the objects 104 from the block 810, as described above with respect to FIG. 3.

Next, in a block 820, the computer 102 determines the first region 126, as described above with respect to FIG. 4.

Next, in a block 825, the computer 102 identifies the stationary objects 104 in the first region 126, as described above with respect to the data block 735.

Next, in a block 830, the computer 102 determines the second region 134, as described above with respect to FIGS. 5A-B.

Next, in a block 835, the computer 102 identifies the stationary objects 104 in the second region 134, as described above with respect to the data block 740.

Next, in a block 840, the computer 102 identifies a preset number of the closest stationary objects 104 from the blocks 825 and 835, as described above with respect to the data block 745.

Next, in a block 845, the computer 102 determines the predicted positions of the moving objects 104 identified in the block 810, as described above.

Next, in a block 850, the computer 102 identifies the moving objects 104 that satisfy at least one of the motion criteria, as described above.

Next, in a block 855, the computer 102 identifies a preset number of the closest moving objects 104 from the block 850, as described above with respect to the data block 755.

Next, in a decision block 860, the computer 102 determines whether any of the objects 104 identified in the blocks 840 and 855 satisfy a criterion for actuating the vehicle component. For example, if the vehicle component is the brake system 110 performing an ADAS function, the criterion can be that the object 104 is within a preset distance in front of the vehicle 100. For another example, if the vehicle component is the steering system 112 as part of autonomous operation of the vehicle 100, a criterion can be that the object 104 is within a planned path of the vehicle 100. The computer 102 can disregard the objects 104 not identified in the blocks 840 and 855 when evaluating the criteria for actuating the vehicle component. If a criterion for actuating a vehicle component is satisfied, the process 800 proceeds to a block 865. If no criterion for actuating a vehicle component is satisfied, the process 800 proceeds to a decision block 870.

In the block 865, the computer 102 instructs the vehicle component for which the criterion was satisfied to actuate, e.g., the brake system 110 to brake, the steering system 112 to turn the vehicle 100, etc. After the block 865, the process 800 proceeds to the decision block 870.

In the decision block 870, the computer 102 determines whether the vehicle 100 is still on. If so, the process 800 returns to the block 805 to continue receiving sensor data. If not, the process 800 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first," "second," and "third" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A computer comprising a processor and a memory storing instructions executable by the processor to:
   receive sensor data indicating a current position of an object;
   determine a predicted position of the object at a future time;
   determine that a motion criterion is met by determining that the current position is in a current zone of a plurality of zones surrounding the vehicle and the predicted position is in a predicted zone of the plurality of zones, the current zone and the predicted zone being prespecified by the motion criterion, the current zone being different than the predicted zone; and
   in response to determining that the motion criterion is met, actuate a component of a vehicle to control motion of the vehicle;
   wherein the zones are nonoverlapping geometric areas and have preset boundaries relative to the vehicle.

2. The computer of claim 1, wherein the motion criterion prespecifies that the predicted zone is forward of the current zone relative to the vehicle when a gear of the vehicle is a forward gear, and that the predicted zone is rearward of the current zone when the gear is a reverse gear.

3. The computer of claim 1, wherein the zones border the vehicle.

4. The computer of claim 1, wherein the component is a brake system.

5. The computer of claim 1, wherein the motion criterion prespecifies a speed of the object relative to a speed of the vehicle.

6. The computer of claim 1, wherein the object is a first object, and the instructions further include instructions to:
   before determining the predicted position of the object, receive sensor data indicating current positions of a plurality of objects including the first object; and
   select a subset of the objects including the first object, the objects in the subset having current positions closer to the vehicle than the objects not in the subset.

7. The computer of claim 6, wherein the plurality of objects are moving objects.

8. The computer of claim 1, wherein
the motion criterion is one of a plurality of motion criteria.

9. The computer of claim 1, wherein the object is a first object, the current position is a first current position, and the instructions further include instructions to:
   receive sensor data indicating a second current position of a second object, the second object being stationary; and
   actuate the component to actuate in response to the second current position being in a region defined relative to the vehicle.

10. The computer of claim 9, wherein the region is different than the zones.

11. The computer of claim 9, wherein the region surrounds the vehicle.

12. The computer of claim 9, wherein the instructions further include instructions to determine the region based on a steering-wheel angle of the vehicle.

13. The computer of claim 12, wherein the region includes an area that will be swept by a body of the vehicle in a direction of travel at the steering-wheel angle.

14. The computer of claim 13, wherein the region is a first region, and the instructions further include instructions to:
   receive sensor data indicating a third current position of a third object, the third object being stationary; and
   instruct the component to actuate in response to the third current position being in a second region defined relative to the vehicle, the second region surrounding the vehicle.

15. The computer of claim 12, wherein a lateral width of the region relative to the vehicle increases with increasing steering-wheel angle.

16. The computer of claim 9, wherein the instructions further include instructions to determine the region based on a speed of the vehicle.

17. The computer of claim 16, wherein a longitudinal length of the region increases with increasing speed of the vehicle.

18. The computer of claim 9, wherein the instructions further include instructions to:
   receive sensor data indicating current positions of a plurality of stationary objects including the second object; and
   select a subset of the stationary objects including the second object, the stationary objects in the subset having current positions closer to the vehicle than the stationary objects not in the subset.

19. The computer of claim 1, wherein the instructions further include instructions to:
   receive sensor data indicating current positions of a plurality of objects including the object;
   select a subset of the objects that have current positions closer to the vehicle than the objects not in the subset; and
   output a message to a user interface indicating the objects in the subset.

20. A method comprising:
   receiving sensor data indicating a current position of an object;
   determining a predicted position of the object at a future time;
   determining that a motion criterion is met by determining that the current position is in a current zone of a plurality of zones surrounding the vehicle and the predicted position is in a predicted zone of the plurality of zones, the current zone and the predicted zone being prespecified by the motion criterion, the current zone being different than the predicted zone; and
   in response to determining that the motion criterion is met, actuating a component of a vehicle to control motion of the vehicle;
   wherein the zones are nonoverlapping geometric areas and have preset boundaries relative to the vehicle.

* * * * *